Sept. 24, 1968     S. E. AGNON     3,402,530

AIR FILTER INSTALLATIONS

Filed Aug. 15, 1963

Inventor
SHMUEL AGNON
By
DEAN, FAIRBANK • HIRSCH
Attorneys

United States Patent Office 3,402,530
Patented Sept. 24, 1968

3,402,530
AIR FILTER INSTALLATIONS
Shmuel E. Agnon, Haifa, Israel, assignor to The State of Israel Ministry of Defence, Hakiria, Tel Aviv, Israel
Filed Aug. 15, 1963, Ser. No. 302,302
Claims priority, application Israel, Aug. 21, 1962, 17,831
1 Claim. (Cl. 55—350)

This invention relates to air filter installations and in particular to installations designed to filter radioactively contaminated air.

The use of such installations always carries with it the requirement of periodically removing and replacing the filter elements. In view of the fact that these filter elements are liable to have become highly contaminated, their handling has to be undertaken under considerable safety precautions. In consequence, the construction of the installations, designed to fulfill the safety requirements, tends to become complicated.

It is an object of the present invention to provide a new and improved air filter installation wherein ready and safe means are provided for handling the filter elements.

According to the present invention there is provided an air filter installation comprising one or more component filter units, each unit having an inlet and outlet chamber provided with respective ducts and separated by a wall in one or more apertures of which are adapted to be located one or more filter elements, said chambers being adapted to communicate through a valve control by-pass, one chamber of one unit being adapted to communicate with a corresponding chamber of the other unit via a control valve, each chamber of each unit being provided, on the one hand, with a posting port and on the other hand with one or more glove ports for facilitating the carrying out of manual operations in the chamber.

As used in the present specification, the term "posting port" refers to the known arrangement whereby components can be introduced and removed from enclosed, possible radioactive, regions through a port which is at all times sealed by means of a flexible plastic (preferably polyethylene) bag.

Figure 1:
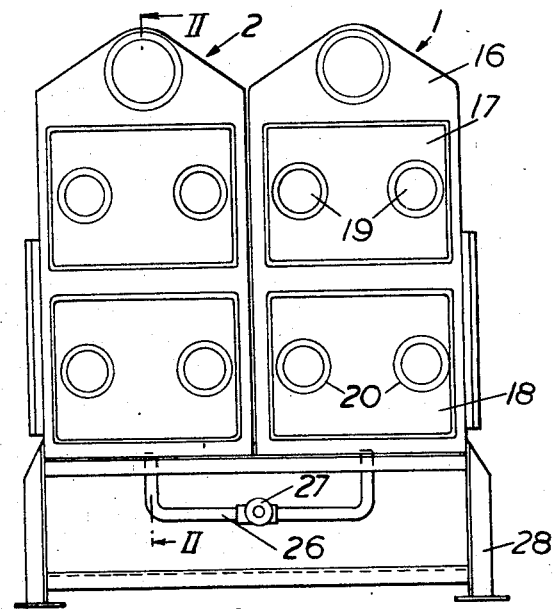
Figure 2:
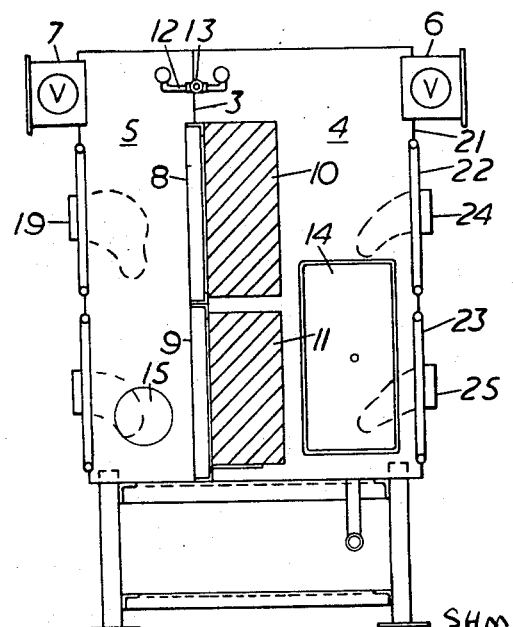

The invention will now be described by way of examples and with reference to the accompanying drawings in which:

FIG. 1 is a front elevation of an air filter installation in accordance with the invention, and FIG. 2 is a longitudinal sectional view taken along the line II—II of the view shown in FIG. 1.

As seen in the drawings the air filter installation comprises 2 identical component filter chambers 1 and 2. Each unit is divided by a wall 3 into an inlet chamber 4 and an outlet chamber 5. The inlet chamber 4 is provided with an inlet duct 6 communication through which is controlled by a valve (not shown) whilst the outlet chamber 5 is provided with an outlet duct 7. The wall 3 has formed therein a pair of apertures 8 and 9 which are respectively closed by filter elements 10 and 11 respectively mounted in frames (not shown) secured to the wall 3. Communication between the inlet and outlet chambers 4 and 5 can be effected through a by-pass 12 controlled by a valve 13 which is of standard construction and is adapted to allow or inhibit throughflow of gas through the bypass. The inlet chamber 4 is provided with a large posting port 14 whilst the outlet chamber 5 is provided with a smaller posting port 15. The front wall 16 of each unit includes a pair of superimposed windows 17 and 18 respectively including glove port pairs 19 and 20. Similarly the rear wall 21 of each unit includes superimposed windows 22 and 23 respectively including glove port pairs 24 and 25. Communication is effected between the inlet chambers 4 of the two units by means of a communicating tube 26 communication through which is controlled by a valve 27. The entire installation is mounted on a metallic framework 28.

In use only one filter unit is employed at a time, the other unit serving as a standby unit. In the event that it is desired to remove or replace one or both of the filters from one of the units, say the unit 1, the inlet and outlet ducts of the unit 2 are opened whilst the inlet and outlet ducts of the unit 1 are closed. In this way, the unit 2 becomes operative in filtering the through-going air. The valve 13 in the by-pass 12 in the unit 1 is then opened thereby equalizing the pressure in the two chambers 4 and 5 of the unit 1. The opening of the inlet and outlet ducts of the unit 2 results in the creation of a suction, i.e., a subatmospheric pressure in both component chambers of the unit 2 and if now the valve 27 in the duct 26 is opened an outflow takes place from the unit 1 to the unit 2 and, as a result, the unit 1 in both of its compartments is also placed under subatmospheric pressure. In this way it is ensured that contaminated gases present in the unit 1 are removed via the unit 2 and that no backflow of contaminated gases from the unit 2 to the unit 1 can take place. A flexible plastic sheet (referred to as a "taping-off" sheet) is then inserted into the compartment 5 of the unit 1 through the posting port 15 thereof and is arranged to cover the aperture 8, the sheet being sealed to the periphery of the aperture by adhesive tape, the operation, referred to as "taping-off" being carried out manually through the glove port pair 19. The filter 10 is then removed out of its casing by an operator who manipulates it, through the glove port pair 24 and the filter is finally removed from the unit through the posting port 14 into a suitable protective bag such, for example, a polyethylene bag. A fresh filter is then posted into the compartment of the unit 1 through the posting port 14 and it is placed in position by the operator operating through the glove port pair 24. After having carried out the same operation through the respective glove port pairs with the filter unit 11, the operator thereupon operating through the glove port pair 19 and 20 removes the taping off sheets and the unit 1 is thereupon ready for operation. Prior to its operation, of course, the by-pass conduit 12 is closed as is the valve 27 in the duct 26.

It will be seen that an installation as described above in accordance with the invention, provided a simple method for filtering radioactive air and for allowing for the rapid replacement of contaminated filter elements.

I claim:
1. An air filter installation comprising at least two component units, a wall in each unit defining inlet and outlet chambers in each unit, an aperture in each said wall, an air filter element releasably mounted in each said aperture, a bypass conduit extending through each said wall and fluidly communicating the inlet chamber with the outlet chamber of each respective unit, a valve in each said bypass conduit operatively associated therewith for opening and closing its associated bypass conduit, each of said inlet chambers having an inlet duct operatively associated therewith for conducting air to be filtered thereinto, a valve in each said inlet duct operatively associated therewith for opening and closing the inlet duct with which it is associated, each of said outlet chambers having an outlet duct operatively associated therewith for conducting filtered air out of said outlet chambers, a valve in each said outlet duct operatively associated therewith for opening and closing the outlet duct with which it is associated, a further duct fluidly communicating the inlet chambers of each unit with the inlet chamber of each other unit, valve means in said further duct for selectively opening and closing said further duct, an air filter posting port in each inlet chamber and operatively associated therewith for posting a filter into and out of said inlet chamber with which the posting port is associated, and each inlet and each outlet chamber having at least one glove port operatively associated therewith for carrying out manual operations within the chamber with which a respective one of said glove ports is associated.

References Cited

UNITED STATES PATENTS

| | | | |
|---|---|---|---|
| 945,632 | 1/1910 | Strahl | 55—498 X |
| 1,642,577 | 9/1927 | Carson. | |
| 1,898,424 | 2/1933 | Collins | 55—483 |
| 1,974,952 | 9/1934 | Eiben | 55—341 |
| 2,804,165 | 8/1957 | Blomgren et al. | 55—385 |
| 3,035,315 | 5/1962 | Saunders | 128—1 X |
| 3,051,164 | 8/1962 | Trexler | 128—1 |
| 3,056,499 | 10/1962 | Liddell | 210—340 X |

FOREIGN PATENTS

| | | |
|---|---|---|
| 832,600 | 2/1952 | Germany. |
| 875,287 | 4/1953 | Germany. |
| 10,164 | 1844 | Great Britain. |
| 447,584 | 5/1936 | Great Britain. |

HARRY B. THORNTON, *Primary Examiner.*

D. TALBERT, *Assistant Examiner.*